United States Patent Office 3,637,681
Patented Jan. 25, 1972

3,637,681
1-TERTIARYAMINO ALKANOYL - 2-HYDROGEN, METHYL OR PHENYL-3-METHYL OR PHENYL-4-OXO-1,2,3,4-TETRAHYDROQUINAZOLINES
Giuseppe Bonola, Milanese, Paolo Da Re, Pisa, and Ivo Setnikar, Milan, Italy, assignors to Societe d'Exploitations Chimiques et Pharmaceutiques Seceph, Lugano, Switzerland
No Drawing. Filed June 12, 1968, Ser. No. 736,289
Claims priority, application Switzerland, June 20, 1967, 8,716/67
Int. Cl. C07d 87/42
U.S. Cl. 260—247.2
21 Claims

ABSTRACT OF THE DISCLOSURE 1,2,3,4-tetrahydroquinazoline derivatives of the general formula:

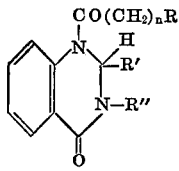

and methods of preparing same. The compounds possess choleretic and antifibrillatory activity.

---

The object of the present invention is new therapeutically active derivatives of 1,2,3,4-tetrahydroquinazoline of the general formula:

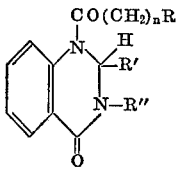

in which:
R is a dimethylamino, diethylamino, morpholino or piperidino radical,
R' is a hydrogen atom or a methyl or phenyl radical,
R" is a methyl radical or a phenyl radical which is unsubstituted or substituted by a chlorine or bromine atom or by a methyl or methoxy group, and
n is 1 or 2, as well as their acid addition salts.

Typical acid addition salts include the hydrochloride, hydrobromide, hydroiodide, sulfate and phosphate salts. The hydrohalide salts may be prepared, for example, by acidification of the base in alcoholic solution with an aqueous solution of the hydrochloric, hydrobromic or hydroiodic acid. By acidifying a solution of the base in acetone with 20% sulfuric acid, the sulfate is obtained, and with 85% phosphoric acid the phosphate is obtained.

These compounds are characterized by their choleretic and antifibrillatory activity. The compounds are indicated in cases of insufficiency of hepatico-biliary secretion, cholangiopathy and hypercholesteremia. The compounds may be administered orally or parenterally in a dosage of 100 mg. two to six times per day.

1-morpholinoacetyl-3-phenyl-4-oxo-1,2,3,4 - tetrahydroquinazoline is a particularly preferred compound.

The preferred method of preparing derivatives of Formula I consists in reacting a compound of the formula:

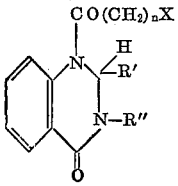

in which X is a reactive ester acid radical such as a chlorine atom or a p-toluene-sulfonate radical with a compound of the formula:

H—R  III

This reaction may be carried out readily by heating starting materials under reflux in benzene. It is advantageous to operate in the presence of an acid-fixing agent which may be an excess of the initial amine.

The tetrahydroquinazoline of Formula II can be prepared by acylation of a tetrahydroquinazoline of the formula:

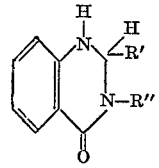

by means of an acyl halide of the formula:

Hal—CO(CH$_2$)$_n$X  V

The tetrahydroquinazoline of the Formula IV can be obtained by cyclization of an N-substituted 2-aminobenzamide of the formula:

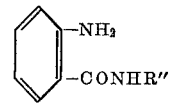

by means of diethyl acetal of formaldehyde, acetaldehyde or benzaldehyde, depending on the nature of R'.

Another method which can be used for the preparation of the derivatives of Formula I consists in acylating a tetrahydroquinazoline of Formula IV with an acyl halide of the formula:

Hal—CO(CH$_2$)$_n$R  VII in which Hal designates a halogen, preferably chlorine. This acylation can be carried out in a solvent such as acetone or chloroform.

The following examples serve to illustrate the invention.

EXAMPLE 1

1 morpholinoacetyl-3-phenyl-4-oxo-1,2,3,4-tetrahydroquinazoline

A mixture of 300 g. (1 mol) of 1-chloroacetyl-3-phenyl-4-oxo-1,2,3,4-tetrahydroquinazoline and 87 g. (2.2 mols) of morpholine in 3000 ml. of anhydrous benzene is heated under reflux for 5 hours.

After cooling, the solid product consisting of 1 mol of morpholine hydrochloride is filtered and collected. The benzene filtrate is extracted with 2000 ml. of 0.5 N hydrochloric acid (1 mol), whereupon the base is liberated by treating the hydrochloric extract with a 10% aqueous solution of sodium carbonate. The base is collected by filtration, dried and crystallized in isopropyl alcohol or acetone or ethyl acetate. 211 g. of the desired product are obtained (60%).

In order to transform the base into hydrochloride, it can be dissolved in the stoichiometric quantity of 0.5 N hydrochloric acid, filtered and concentrated to a small volume under vacuum at 35–40° C. The base may also be dissolved in a mixture of benzene and ether, the solution acidulated by means of an ethanolic HCl solution, set aside for one night and the hydrochloride collected.

The initial 1-chloroacetyl - 3 - phenyl - 4 - oxo-1,2,3,4-tetrahydroquinazoline can be prepared in the following manner. Into a mixture of 224 g. (1 mol) of 3-phenyl-4-oxo - 1,2,3,4 - tetrahydroquinazoline and 152 g. (1.1 mol) of anhydrous potassium carbonate in 2500 ml. of dioxane or acetone heated on a water bath with agitation, there are added drop by drop 113 g. (1 mol) of chloroacetyl chloride. The mixture is left on the water bath for 15 minutes and then diluted with water; the solid product is collected and crystallized from ethanol. The quantity obtained is 220 g. (73%).

EXAMPLE 2

1-morpholinoacetyl-2-methyl-3-phenyl-4-oxo-1,2,3,4-tetrahydroquinazoline

One proceeds in the same way as in Example 1, but starting with 314 g. (1 mol) of 1-chloroacetyl-2-methyl-3-phenyl-4-oxo-1,2,3,4-tetrahydroquinazoline.

In order to obtain the initial quinazoline, one also proceeds in the same manner as described in Example 1, but starting with 238 g. (1 mol) of 2-methyl-3-phenyl-4-oxo-1,2,3,4-tetrahydroquinazoline. The latter is a new compound which can be prepared in the following manner:

A solution of 212 g. (1 mol) of 2-aminobenzanilide in 1750 ml. of boiling ethanol is acidulated with an alcoholic HCl solution until a shift in the color of Congo red, whereupon 236 g. (2 mols) of diethyl acetal of acetaldehyde are added and the mixture is heated under reflux for 4 hours. Thereupon the solution is diluted with 1750 ml. of water and set aside overnight. The product is collected and crystallized from ethanol. Quantity: 150 g. (63%); M.P. 166–169° C.

*Analysis.*—Calculated for $C_{15}H_{14}N_2O$, molecular weight 238.28 (percent): C, 75.60; H, 5.92; N, 11.76. Found (percent): C, 75.65; H, 6.08; N, 11.65.

In Table I below there are set forth the melting points and analyses of the compounds obtained in the above examples and those of other compounds which are prepared in similar fashion as previously described. The symbols R, R' and R'' are those appearing in Formula I above.

TABLE I.—(COMPOUNDS 1–8)

| Compound number | (CH₂)ₙR | R' | R'' | M.P., °C | Formula | Calculated C | H | N | Cl | CH₃O | Found C | H | N | Cl | CH₃O |
|---|---|---|---|---|---|---|---|---|---|---|---|---|---|---|---|
| 1 | CH₂N〈O〉 | H | C₆H₄CH₃-p | 108–111 | C₂₂H₂₅N₃O₂ | 72.70 | 6.94 | 11.56 | | | 72.95 | 7.04 | 11.81 | | |
| 2 | CH₂N〈O〉·HCl | H | Same | ¹230 | C₂₂H₂₅N₃O₂·HCl | 66.07 | 6.55 | 10.51 | 8.87 | | 66.02 | 6.74 | 10.26 | 8.56 | |
| 3 | CH₂N〈O〉 | H | C₆H₅ | {135–137 / ᵃ128–130} | C₂₀H₂₁N₃O₃ | 68.36 | 6.03 | 11.96 | | | 68.66 | 5.82 | 12.02 | | |
| 4 | CH₂N〈O〉·HCl | H | C₆H₅ | 210–214 | C₂₀H₂₁N₃O₃·HCl | 61.93 | 5.72 | 10.83 | 9.14 | | 61.94 | 6.19 | 10.97 | 9.35 | |
| 5 | CH₂N〈O〉 | H | C₆H₄CH₃-p | 126–128 | C₂₁H₂₃N₃O₃ | 69.02 | 6.35 | 11.50 | | | 69.37 | 6.15 | 11.69 | | |
| 6 | CH₂N〈O〉·HCl·H₂O | H | Same | 202–203 | C₂₁H₂₃N₃O₃·HCl·H₂O | | | 9.78 | 8.44 | | | 6.08 | 9.94 | 8.75 | |
| 7 | CH₂CH₂N〈O〉 | H | C₆H₅ | 113–114 | C₂₁H₂₃N₃O₃ | 69.02 | 6.35 | 11.50 | | | | 6.32 | 11.67 | | |
| 8 | CH₂CH₂N〈O〉·HCl·C₂H₅OH | H | C₆H₅ | 203–206 | C₂₁H₂₃N₃O₃·HCl·C₂H₅OH | 61.67 | 6.75 | 9.38 | 7.92 | | 61.79 | 6.46 | 9.57 | 8.06 | |
| 9 | CH₂CH₂N〈O〉 | H | C₆H₅ | 116–118 | C₂₂H₂₅N₃O₂ | 72.70 | 6.94 | 11.56 | | | 72.65 | 6.95 | 11.81 | | |
| 10 | CH₂CH₂N〈O〉·HCl | H | C₆H₅ | ¹125 | C₂₂H₂₅N₃O·HCl | | | 10.51 | 8.87 | | | | 10.21 | 8.41 | |
| 11 | CH₂CH₂N〈O〉 | H | C₆H₄CH₃-p | 133–135 | C₂₂H₂₅N₃O₃ | 69.63 | 6.64 | 11.08 | | | 69.10 | 6.61 | 11.13 | | |

Footnotes at end of table.

TABLE I.—(COMPOUNDS 1-8)—Continued

| | (CH₂)ₗR | R' | R'' | M.P., °C. | Formula | Calculated C | H | N | Cl | CH₃O | Found C | H | N | Cl | CH₃O |
|---|---|---|---|---|---|---|---|---|---|---|---|---|---|---|---|
| 12 | CH₂CH₂N◯O·HCl | H | C₆H₄OCH₃-p | 213-215 | C₂₂H₂₉N₃O₃·HCl | | | 10.10 | 8.53 | | | | 10.33 | 8.55 | |
| 13 | CH₂CH₂N◯ | H | Same | 113-115 | C₂₃H₂₇N₃O₂ | 73.18 | 7.21 | 11.13 | | | 73.36 | 7.42 | 11.41 | | |
| 14 | CH₂CH₂N◯·HCl | H | ----do---- | 204-206 | C₂₃H₂₇N₃O₂·HCl | | | 10.15 | 8.57 | | | | 10.09 | 8.27 | |
| 15 | CH₂N◯ | H | C₆H₅ | 101-103 | C₂₁H₂₃N₃O₂ | 72.18 | 6.64 | 12.03 | | | 72.30 | 6.93 | 11.70 | | |
| 16 | CH₂N◯O·HCl | H | C₆H₅ | 230-231 | C₂₁H₂₃N₃O₂·HCl | | | 10.89 | 9.19 | | | | 10.68 | 9.30 | |
| 17 | CH₂N(C₂H₅)₂ | H | C₆H₄CH₃-p | 76-79 | C₂₁H₂₅N₃O₂ | 71.77 | 7.17 | 11.96 | | | 71.72 | 7.21 | 11.81 | | |
| 18 | CH₂N(C₂H₅)₂·HCl | H | Same | 211.5-212.5 | C₂₁H₂₅N₃O₂·HCl | | | 10.83 | 9.14 | | | | 10.77 | 9.17 | |
| 19 | CH₂N(C₂H₅)₂ | H | C₆H₅ | 77-80 | C₂₀H₂₃N₃O₂ | 71.19 | 6.87 | 12.45 | | | 70.99 | 6.41 | 12.36 | | |
| 20 | CH₂N(C₂H₅)₂·HCl | H | C₆H₅ | 138-140 | C₂₀H₂₃N₃O₂·HCl | | | 11.24 | 9.49 | | | | 11.36 | 9.27 | |
| 21 | CH₂N(CH₃)₂ | H | C₆H₅ | 97-99 | C₁₈H₁₉N₃O₂ | 69.88 | 6.19 | 13.58 | | | 69.42 | 6.26 | 13.31 | | |
| 22 | CH₂N(CH₃)₂·HCl | H | C₆H₅ | 228-229 | C₁₈H₁₉N₃O₂·HCl | | | 12.15 | 18.25 | | | | 11.90 | 10.02 | |
| 23 | CH₂N(CH₃)₂·HCl | H | C₆H₄Cl-m | 169-171 | C₂₀H₂₀ClN₃O₃ | 62.25 | 5.23 | 10.89 | 9.19 | | 62.60 | 5.30 | 10.69 | 9.20 | |
| 24 | CH₂N◯ | H | Same | 176-177 | C₂₀H₂₀ClN₃O₃·HCl | | | 9.95 | 16.79 | | | | 10.01 | 16.55 | |
| 25 | CH₂N◯O·HCl | H | C₆H₄OCH₃-p | 144-145 | C₂₁H₂₃N₃O₄ | 66.13 | 6.08 | 11.02 | | 8.14 | 65.98 | 6.22 | 11.07 | | 8.10 |
| 26 | CH₂N◯O·HCl | H | Same | 212.5-213.5 | C₂₁H₂₃N₃O₄·HCl | | | 10.06 | 8.49 | | | | 10.19 | 8.55 | |
| 27 | CH₂N(C₂H₅)₂ | H | C₆H₄Cl-m | 106-108 | C₂₀H₂₂ClN₃O₂ | 64.59 | 5.96 | 11.30 | 9.54 | | 64.82 | 5.91 | 11.48 | 9.09 | |
| 28 | CH₂N(C₂H₅)₂·HCl | H | Same | 110 | C₂₀H₂₂ClN₃O₂·HCl | | | 10.29 | 17.37 | | | | 9.99 | 17.12 | |
| 29 | CH₂N(CH₃)₂ | H | ----do---- | 139-141 | C₁₈H₁₈ClN₃O₂ | 62.88 | 5.28 | 12.22 | 10.31 | | 62.96 | 4.98 | 12.36 | 9.97 | |
| 30 | CH₂N(CH₃)₂·HCl | H | ----do---- | 199-203 | C₁₈H₁₈ClN₃O₂·HCl | | | 11.05 | 18.65 | | | | 11.35 | 18.38 | |
| 31 | CH₂N(C₂H₅)₂ | H | C₆H₄OCH₃-p | 124-125 | C₂₁H₂₅N₃O₃ | 68.64 | 6.86 | 11.44 | | 8.45 | 68.55 | 6.84 | 11.34 | | 8.52 |
| 32 | CH₂N(C₂H₅)₂·HCl·H₂O | H | Same | 144-147 | C₂₁H₂₅N₃O₂·HCl·H₂O | 59.78 | 6.69 | 9.96 | 8.41 | | 59.46 | 6.75 | 9.99 | 8.41 | |
| 33 | CH₂N◯ | H | C₆H₄Cl-m | 139-141 | C₂₁H₂₂ClN₃O₂ | 65.70 | 5.78 | 10.95 | 9.24 | | 65.64 | 5.89 | 10.81 | 9.35 | |

Footnotes at end of table.

TABLE I.—(COMPOUNDS 1-8)—Continued

| | (CH₂)lR | R' | R'' | M.P., °C | Formula | Calculated C | H | N | Cl | CH₃O | Found C | H | N | Cl | CH₃O |
|---|---|---|---|---|---|---|---|---|---|---|---|---|---|---|---|
| 34 | CH₂N⟨piperidine⟩·HCl | H | C₆H₄Cl-m | 215-217 | C₂₁H₂₂ClN₃O₂·HCl | | | 10.00 | 16.87 | | | | 10.08 | 16.86 | |
| 35 | CH₂N(CH₃)₂ | H | C₆H₄CH₃-p | 111-113 | C₁₉H₂₁N₃O₂ | 70.56 | 6.55 | 13.00 | | | 70.60 | 6.72 | 12.98 | | |
| 36 | CH₂N(CH₃)₂·HCl | H | Same | 223-224 | C₁₉H₂₁N₃O₂·HCl | | | 11.68 | 9.86 | | | | 11.88 | 10.04 | |
| 37 | CH₂N⟨piperidine⟩ | H | C₆H₄OCH₃-p | 119-121 | C₂₂H₂₅N₃O₃ | 69.63 | 6.64 | 11.08 | | 8.18 | 69.90 | 6.25 | 11.05 | | 8.08 |
| 38 | CH₂N⟨piperidine⟩·HCl | H | Same | 228-230 | C₂₂H₂₅N₃O₃·HCl | | | 10.11 | 8.53 | | | | 10.22 | 8.43 | |
| 39 | CH₂N(CH₃)₂ | H | ...do... | 116-117 | C₁₉H₂₁N₃O₃ | 67.24 | 6.24 | 12.38 | | 9.14 | 67.19 | 6.02 | 12.14 | | 9.00 |
| 40 | CH₂N(CH₃)₂·HCl | H | ...do... | 112-113 | C₁₉H₂₁N₃O₃·HCl | | | 11.18 | 9.44 | | | | 11.09 | 9.44 | |
| 41 | CH₂N⟨morpholine⟩ | H | C₆H₄Br-p | 181-182 | C₂₀H₂₀BrN₃O₃ | 55.82 | 4.68 | 9.77 | ²18.57 | | 56.05 | 4.66 | 9.73 | ²18.61 | |
| 42 | CH₂N⟨morpholine⟩·HCl | H | Same | ¹220 | C₂₀H₂₀BrN₃O₃·HCl | | | 9.02 | 7.61 | | | | 9.09 | 7.61 | |
| 43 | CH₂N⟨morpholine⟩·HCl | H | C₆H₄CH₃-o | 138-140 | C₂₁H₂₃N₃O₃·HCl | 69.02 | 6.35 | 11.50 | | | 69.09 | 6.25 | 11.43 | | |
| 44 | CH₂N⟨morpholine⟩·HCl | H | Same | ¹222-225 | C₂₁H₂₃N₃O₃·HCl | | | 10.46 | 8.82 | | | | 10.64 | 8.90 | |
| 45 | CH₂N⟨morpholine⟩ | CH₃ | C₆H₅ | 133-135 | C₂₁H₂₃N₃O₃ | 69.02 | 6.35 | 11.50 | | | 69.18 | 6.27 | 11.29 | | |
| 46 | CH₂N⟨morpholine⟩·HCl | CH₃ | C₆H₅ | ¹127-130 | C₂₁H₂₃N₃O₃·HCl | | | 10.46 | 8.82 | | | | 10.39 | 8.99 | |
| 47 | CH₂N⟨morpholine⟩ | C₆H₅ | CH₃ | 150-161 | C₂₁H₂₃N₃O₃ | 69.02 | 6.35 | 11.50 | | | 68.64 | 6.75 | 11.29 | | |
| 48 | CH₂N⟨morpholine⟩·HCl | C₆H₅ | CH₃ | ¹243-245 | C₂₁H₂₃N₃O₃·HCl | | | 10.46 | 8.82 | | | | 10.45 | 8.81 | |

¹ Decomposed.   ² Other crystalline form.

In the following Table II there are listed the melting points and analyses of starting quinazolines:

TABLE II

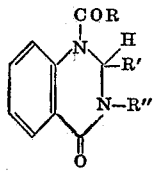

| R | R' | R'' | M.P., °C. | Formula | Analysis, percent Calculated N | Cl | Found N | Cl |
|---|---|---|---|---|---|---|---|---|
| CH₂CH₂Cl | H | C₆H₅ | 112–113 | C₁₇H₁₅ClN₂O₂ | 8.90 | 11.27 | 9.00 | 11.19 |
| CH₂Cl | H | C₆H₄CH₃p | 150–153 | Same | 8.90 | 11.27 | 9.18 | 11.34 |
| CH₂Cl | H | C₆H₅ | 179–181 | C₁₆H₁₃ClN₂O₂ | 9.32 | 11.79 | 9.57 | 11.52 |
| CH₂CH₂Cl | H | C₆H₄CH₃p | 133–135 | C₁₈H₁₇ClN₂O₂ | 8.52 | 10.78 | 8.35 | 11.08 |
| CH₂Cl | H | C₆H₄Clm | 114–116 | C₁₆H₁₂Cl₂N₂O₂ | 8.36 | 21.15 | 8.36 | 21.18 |
| CH₂Cl | H | C₆H₄OCH₃p | 133–135 | C₁₇H₁₅ClN₂O₃ | 8.47 | 10.72 | 8.72 | 10.56 |
| CH₂Cl | H | C₆H₄Brp | 158–160 | C₁₆H₁₂BrClN₂O₂ | 7.38 | 9.34 | 7.37 | 9.31 |
| CH₂Cl | H | C₆H₄CH₃o | 125–126 | C₁₇H₁₅ClN₂O₂ | 8.90 | 11.27 | 9.13 | 11.03 |
| CH₂Cl | CH₃ | C₆H₅ | 147–149 | Same | 8.90 | 11.27 | 9.11 | 11.66 |
| CH₂Cl | C₆H₅ | CH₃ | 178–180 | do | 8.90 | 11.27 | 8.88 | 11.17 |

The following Table III illustrates the pharmacological activities of many of the above described compounds.

The testing procedures were as follows:

Pharmacological Methods—Animals: NMRI albino mice (18–20 g.) and Wistar albino rats (200–250 g.) were used. For choleretic activity, 100 days old Wistar albino female rats of 220–240 g. were used.

Acute toxicity—$LD_{50}$ values were determined in mice intraperitoneally, and the mortality over 5 days was recorded. The animals were also observed for behaviour and objective symptoms according to the Irwin scheme. (S. Irwin: General philosophy and methodology of screening, Gordon Research Conference—New London, 1959.)

Choleretic acivity—Female rats, after 14 hr. fasting and anaesthetized with urethan, were used. The substances were injected in the duodenum. The bile flow was recorded 1 hr. before and 1 hr. after the administration of the compounds, by means of a graduated pipette connected to the cannulated choledochus.

Antifibrillatory activity—The compounds were given intravenously to rats anaesthetized with pentobarbital sodium, and their ability to prevent cardiac arrhythmias induced by $CaCl_2$ was determined. Active compounds were than tested on rabbit heart by the method of Visentini. (P. Visentini, Arch. It. Sc. farmacol., 4, 16 (1954).) The heart was stimulated with a frequency of 50 per second for 1 msec. The intensity which provoked the fibrilation was recorded before and after 20 minutes of perfusion with the testing compounds.

TABLE III

| No. | Choleretic activity, mg./kg.ᵃ,ᵈ | Antifibrillatory activity Mg./kg.ᵇ,ᵈ | Mg./l.ᶜ,ᵈ | $LD_{50}$, mg./kg. ip | Other phar- macol. activ- ities |
|---|---|---|---|---|---|
| 4 | 6.25 | (48) | (10) | ʰ 560 | |
| 6 | 25 | 31 | (10) | ʰ 500 | |
| 26 | (130) | 41 | | 1,300 | (k) |
| 42 | 45 | (56) | | ʰ 450 | (l,m) |
| 24 | 75 | (190) | | 1,500 | (k) |
| 44 | 30 | (36) | | ʰ 300 | (l,m) |
| 46 | 20 | (25) | | ʲ 200 | (m) |
| 48 | 35 | 44 | | ʲ 350 | (m) |
| 8 | 12.5 | (31) | | ʲ 250 | |
| 12 | 30 | 37 | | 300 | |
| 16 | 18 | (22) | | ʲ 180 | |
| 2 | 15 | 10 | ᶠ 0.81 | ʲ 150 | |
| 38 | 25 | 31 | | 250 | |
| 34 | (25) | 12 | ᶠ 1.8 | ʲ 250 | |
| 10 | (8) | 10 | ᵍ 2.6 | 80 | |
| 14 | (15) | ᶜ (5) | | 150 | |
| 22 | (25) | (31) | | 250 | |
| 36 | (28) | 10 | ᵍ 6.2 | ʲ 280 | |
| 40 | (20) | 25 | | ʲ 200 | |
| 30 | (30) | 38 | | ʲ 300 | |
| 20 | (25) | 31 | | ʲ 250 | |
| 18 | 25 | 16 | ᶠ 3.3 | 250 | |
| 32 | (20) | 12 | | ʲ 200 | |
| 28 | (20) | 6 | ᶠ 2.5 | ʲ 200 | |

ᵃ Dose which increased the bile flow to 50 percent. Maximum tested doses were 1/10 of $LD_{50}$. Sodium dehydrocholate was active at 50 mg./kg.
ᵇ Dose which prevented the cardiac arrhythmia in 50 percent of animals. Maximum tested doses were 1/8 of $LD_{50}$. Procainamide was active at 50 mg./kg.
ᶜ Concentration which reduced to 50 percent the heart sensitivity to the electric stimulation. Maximum tested doses were 10 mg./l.
ᵈ Numbers in parentheses are maximum tested non active doses.
ᵉ Superior doses were toxic.
ᶠ Quinidine was active at 2.8 mg./l.
ᵍ Quinidine was active at 6.1 mg./l.
ʰ Clonic convulsions.
ⁱ Hypnosis.
ʲ Tonic convulsions.
ᵏ Anticonvulsant activity.
ˡ Transient increase of arterial blood pressure and stimulant effect on respiration.
ᵐ Inhibition of formalin edema of the paw.

What is claimed is:
1. A compound of the formula

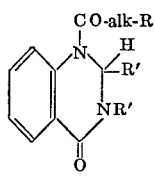

wherein

R is dimethylamino, diethylamino, morpholino or piperidino;
R' is hydrogen, methyl or phenyl;
R'' is methyl, phenyl, chlorophenyl, bromophenyl, methylphenyl or methoxyphenyl; and
alk is methylene or ethylene or the pharmaceutically acceptable acid addition salts thereof.

2. A compound of claim 1, wherein R is morpholino.
3. A compound of claim 1, wherein R is piperidino.
4. A compound of claim 1, wherein R is dimethylamino.
5. A compound of claim 1, wherein R is diethylamino.
6. The compound of claim 2, wherein R' is hydrogen, R'' is phenyl and alk is methylene.
7. The compound of claim 3, wherein R' is hydrogen and R'' is

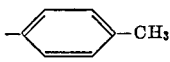

and alk is methylene.

8. The compound of claim 2, wherein R' is hydrogen and R'' is

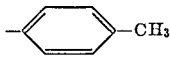

and alk is methylene.

9. The compound of claim 2, wherein R' is hydrogen, R'' is phenyl and alk is ethylene.
10. The compound of claim 3, wherein R' is hydrogen, R'' is phenyl and alk is ethylene.
11. The compound of claim 2 wherein R' is hydrogen, R'' is

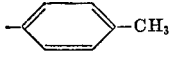

and alk is ethylene.

12. The compound of claim 3, wherein R' is hydrogen, R'' is phenyl and alk is methylene.
13. The compound of claim 5, wherein R' is hydrogen, R'' is

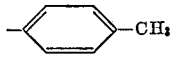

and alk is methylene.

14. The compound of claim 2, wherein R' is hydrogen, R'' is

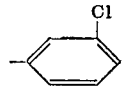

and alk is methylene.

15. The compound of claim 5, wherein R' is hydrogen, R'' is

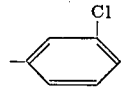

and alk is methylene.

16. The compound of claim 3, wherein R' is hydrogen, R'' is

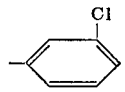

and alk is methylene.

17. The compound is claim 4, wherein R' is hydrogen, R'' is

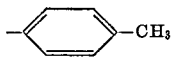

and alk is methylene.

18. The compound of claim 3, wherein R' is hydrogen, R'' is

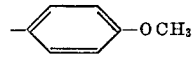

and alk is methylene.

19. The compound of claim 2, wherein R' is hydrogen, R'' is

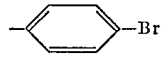

and alk is methylene.

20. The compound of claim 1, wherein R' is hydrogen, R'' is

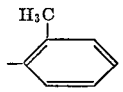

and alk is methylene.

21. The compound of claim 1, wherein R' is phenyl, R'' is methyl and alk is methylene.

No references cited.

ALEX MAZEL, Primary Examiner
J. TOVAR, Assistant Examiner

U.S. Cl. X.R.
260—256.4 P; 424—248